May 28, 1963
P. H. METZLER
3,091,050
LINE RETAINING MEANS FOR FISHING LINE ACCESSORIES
Filed Aug. 7, 1961
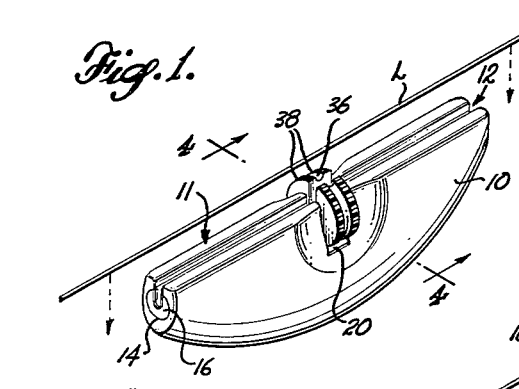
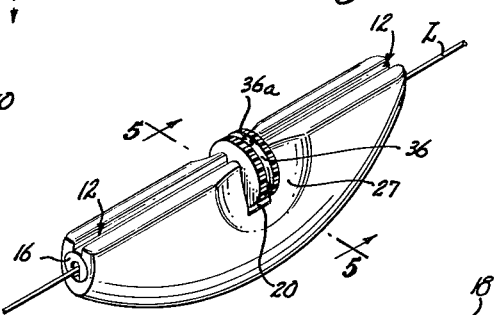
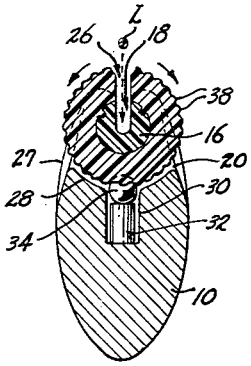
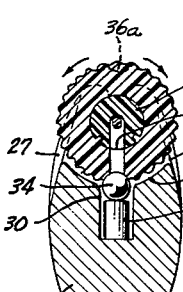
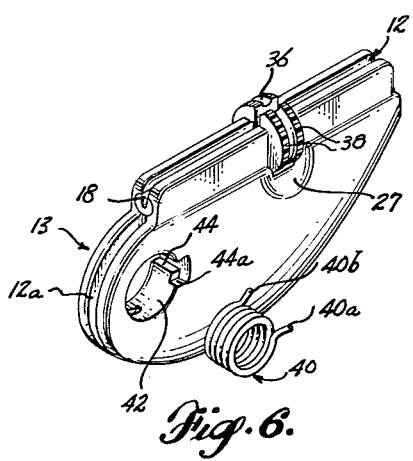
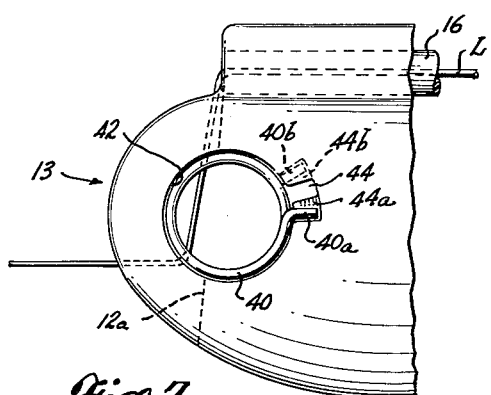
INVENTOR.
PHARES H. METZLER
BY Reynolds & Christensen
ATTORNEYS

United States Patent Office 3,091,050
Patented May 28, 1963

3,091,050
LINE RETAINING MEANS FOR FISHING LINE ACCESSORIES
Phares H. Metzler, 12999 Standering Lane, Seattle, Wash.
Filed Aug. 7, 1961, Ser. No. 129,655
10 Claims. (Cl. 43—44.88)

The invention relates to fishing equipment and particularly to improvements in means for retaining lines in fishing accessories such as sinkers, and the like. The present invention is herein illustratively described with respect to particular embodiments thereof; however, it will be recognized that certain features may be adapted in other embodiments without departing from the essential nature of the invention.

In certain types of fishing it is necessary to change frequently the equipment used on lines, particularly sinkers, to adjust for different fishing conditions. For example, changes in weights may be necessary to find the depth of the fish, or to adjust to changes in velocity and direction of tidal currents and other conditions. Changes in other accessories, such as plugs and the like, may be necessary to determine to what lures the fish will be attracted. It is therefore desirable and important to provide a means of easily and quickly replacing certain accessories on the line with others. While the discussion of the present invention will hereafter proceed with respect to its use in sinkers, which is its primary intended application, it will be recognized that the invention may also be applied to advantage in other fishing line accessories and the like.

For certain types of fishing, for example, salmon fishing, it is considered very important to provide a sinker which is free to slide on the line in order to prevent loosening of the hooks or snapping of the leader under the sudden sharply exerted strain of a heavy fish reacting against the sinker weight. At the same time it is desirable to provide a means of clamping the sinker to the line at a position above the lure, allowing the lure to trail at some distance behind the sinker in trolling, for example, and yet to be released by a strike so as to slide down the line to the lure for convenience in bringing the fish all the way in to be netted or gaffed.

Various sinkers have been intended to provide the above desirable features, but most have been awkward to handle and have involved protruding wire parts which must be flexed to achieve the necessary removability and which have been found to become entangled with the line itself or with sea weed, or to crystallize and break with repeated flexures. Those which have utilized mechanically movable metal latches and fasteners have often been subject to corrosion freezing the parts together. Many have been difficult to manipulate, especially with cold hands. Also many have been unsatisfactory from the manufacturing standpoint. Further, the use of metal for the parts and surfaces slidably engageable with a line often resulted in line fraying and weakening due to difficulty with eliminating all burrs and sharp edges.

It is a general object of the present invention to provide a durable and versatile line retaining means for sinkers and other fishing equipment which will overcome the above difficulties and satisfy the described requirements.

A related object is to provide a line retaining means which is readily operable with cold hands and requires no difficult threading of the line or other complicated manipulation for connecting and disconnecting the same to and from the line.

Another object is to provide an improved sinker of the readily disconnectible type which may be fastened to or removed from the line by one simple revolving operation.

A further object is to provide a sinker with no protruding wire line retaining parts which may become entangled with sea weed or caught and bent when in contact with other equipment, but is durable and of one piece. A related object is to provide a sinker which employs a line-retaining coil spring clamp which does not protrude from the sinker body, but which is durably retained therein for longer and trouble-free life.

Another object of the present invention is to provide a line-retaining means with parts which do not become frozen by corrosion or weakened by constant use.

It is still another object to provide a sinker of simple construction for lower cost of manufacture.

A further and highly important object is to provide a sinker in which the line comes in contact with no hard and sharp edges or wires to become worn or cut thereby, but which provides a continuous smooth groove in a protective material, preferably of a plastic type, against which the line may slide without damage, yet which may be manufactured on a mass basis at low cost.

As herein disclosed with reference to fishing sinkers, the invention resides in the provision of a sinker body having a longitudinal groove in its top side which widens into a cylindrical bore at its base retaining a revolvable cylindrical member of plastic material. The latter also has a longitudinal groove which, when rotated into registry with the body groove, receives or releases a line from the latter, but which when rotated out of registry therewith slidably retains the line in the body. A round knob on the cylindrical member permits rotating it into and from such positions at will.

A specially formed releasable line gripping means at one end of the sinker holds the line against sliding through the sinker, until the line is released from the gripping means by the strike of a fish. This gripping means features a multicoil spring retained in a transverse aperture and having turned ends engaged in recesses at the ends of the aperture wall, holding the spring under some stress and against relative bodily movement in the aperture. The line is pressed between spring coils through a body slot which intersects the aperture, preferably in a vertical plane.

These and other features, objects and advantages of this invention will become apparent from the following detailed description taken in connection with the accompanying drawings, wherein are set forth by way of illustration and example certain embodiments of this invention.

FIGURE 1 is a perspective view showing a sinker body provided with the present invention in disconnected relation to a line to be retained therein.

FIGURE 2 is a perspective view showing the sinker of FIGURE 1 with the novel line retaining means revolved to slidably hold the line.

FIGURE 3 is a perspective view showing the revolving member in disassembled relation.

FIGURE 4 is a longitudinal cross-sectional view taken on line 4—4 of FIGURE 1, showing the internal configuration with the line released from the sinker.

FIGURE 5 is a longitudinal cross-sectional view taken on line 5—5 of FIGURE 2, showing the internal configuration with the retaining means revolved to hold the sinker slidably on the line.

FIGURE 6 is a perspective view of a sinker body of different configuration employing the same line retaining means and provided with a line clamp in the forward portion thereof, showing the spring coil line clamp disassembled from the body.

FIGURE 7 is an enlarged fragmentary side view showing one end portion of the sinker of FIGURE 6 in assembled condition, and showing in partial cutaway the revolving base member and the line retained therein.

Referring in more detail to the drawings, the numeral 10 designates the sinker body, in this instance preferably of a downwardly convex, crescent shape. Along its straight upper edge or side is an upwardly open straight groove 12 extending longitudinally throughout the length of the body 10 and opening endwise therefrom. The groove 12 extends radially into a longitudinal cylindrical bore 14 through the body 10 which bore also opens at both ends. In the bore 14 is a cylindrical bore member 16 fitted to revolve within the bore and provided with a longitudinal groove 18 preferably corresponding in width to the groove 12 in the body, the bottom of the groove 18 lying substantially along the central longitudinal axis of the bore member 16. The groove 13 is revolvably alignable with the groove 12 in the body 10 to receive a fishing line L therein. The bore member 16 is preferably made of a durable noncorrosive material, such as nylon or other thermoplastic material, so as to prevent "freezing" of the same within the bore by corrosion and to protect the fishing against chafing and wear on sharp edges of metal.

The body 10 is provided with a transverse slot 20 located extending downward from its upper edge intermediate the ends of the body. This slot 20, intersecting the groove 12 and the bore 14 receives an operating member or knob 22 in assembly with the bore member 16. The knob 22 is of substantially toroidal form having a central opening 24 therethrough in which is received the bore member 16. Cutting longitudinally through the toroidal member 22 is a slot 26 which extends radially from the periphery thereof into the central opening 24. The slot 26 is of a width corresponding to the width of the grooves 12 and 18 in the body 10 and the bore member 16, respectively.

Circumferentially spaced locking ribs 24a and 24b on the knob 22 extend radially into the central opening 24 thereof adjacent opposite sides of the slot 26. To cooperate with these ribs 24a and 24b complementally formed slots 16a and 16b in the bore member 16 are located on opposite sides of the groove 18 at a location intermediate the ends of the bore member. The knob 22 is of a durable noncorrosive flexible, resilient material, such as nylon or other thermoplastic substance having flexibility, permitting it to be forced by expansion over and along the bore member 16 into an intermediate position thereon wherein the ribs 24a and 24b snap into the slots 16a and 16b and lock the knob on the bore member.

In actual assembly of the sinker the operating knob member 22 is placed in the slot 20 in the body with its opening aligned with bore 14, whereupon the bore member is inserted endwise along the bore 14 and through knob 22 properly oriented in rotative position so that the ribs of knob 22 lock it in place in the sinker when it reaches the fully inserted position. The ribs 24a and 24b engaging grooves 16a and 16b maintain the slot 26 of knob 22 in registry with groove 18 of bore member 16. The knob may then be turned at will to register groove 18 with groove 12 in the body to receive a stretch of fishing line pressed laterally of itself into groove 12. The knob may then be gripped to turn the bore member groove out of registry with the body groove and thereby retain the line slidably therewithin.

Referring in more detail to the body 10, the transverse slot 20 in this instance is located centrally intermediate the ends of the body, and the body is provided with depression 27 adjacent slot 20 on laterally opposite sides of the body so that the body thickness near the slot is less than the diameter of the knob 22. This facilitates gripping and turning the knob. To further facilitate gripping and turning the knob the longitudinal bore 14 is located within the body at a depth below the straight upper side 11 thereof, substantially less than the radius of the knob so that the latter also protrudes accessably above the sinker body. The operating member may thus more easily be gripped to be spread apart during assembly to accommodate the bore member. A further advantage of protrusion of the operating member above the straight upper edge of the body is that when the slot 26 and groove 18 are in vertical alignment with the groove 12 in the body, the slotted portion of the operating member serves as a guide for insertion of the line L into the grooves.

While friction alone may be relied upon to maintain the revolving bore member in a line-retaining position of deregistry of the groove entrances, preferably a resiliently acting detent means is provided, as now to be described. A transverse slot 20 is preferably formed in the body 10 with a downwardly convex bottom 28 as shown in FIGURES 4 and 5. Centrally located in the bottom 28 of the transverse slot 20 is a recess or hole 30 extending radially away from the operating member 22 within the slot and being of a relatively shallow depth (measured vertically of the body). Placed within the hole 30 is a resilient member 32 of a noncorrosive resilient material such as a block or pad of neoprene rubber and being of a length slightly less than the depth of hole 30. Resting against the top end of the resilient member 32 and guided by the rim of the hole 30 is a spherical ball 34, preferably of stainless steel or a hard plastic substance. The knob 22 is provided with a shallow groove 36 passing centrally around the periphery thereof. The ball 34 is pressed into the peripheral groove 36 by expansion force of resilient member 32. Groove 36 is widened and deepened at a location diametrically opposite the radial slot 26 in the operating member 22 to form a detent recess 36a. The ball 34 engaging recess 36a tends to hold the bore member 16 in a position with its groove in registry with the groove 12 in the body, that is, in position for receiving the fishing line L, as shown in FIGURE 4. However, once the line is placed in the aligned grooves the knob 22 may be turned manually, yielding from recess 36a. The knob thereupon turns easily and smoothly, the ball 34 rolling or sliding in its captive position between the knob and resilient member. To retain the revolving members reliably in the nonregistered position for holding the line, the ball 34 cooperates with the entrance of knob slot 26 as a further detent means holding the bore member in the inverted position, as shown in FIGURE 5.

It can be readily seen from FIGURE 5 that there is no tendency for the revolving members to be turned from the inverted or deregistered line retaining position by a force on the line L, since the line is held at or near the center of rotation of the revolving members and therefore can apply no turning moment thereto. On the other hand, the knob may be quite easily turned manually to dislodge the ball from the slot, since the arm of leverage in that case is equal to the radius of the operating member 22. The said operating member is provided with a serrated edge 38 around the periphery thereof to facilitate gripping and turning the bore member against the force of the detent.

Another embodiment of the invention is shown in FIGURES 6 and 7, wherein the body 10 is provided with a built-in line clamp 40. In this instance, the body 10 is provided with the same revolving line-retaining means as described. In addition the body has a convexly rounded portion 13 extending beyond one end of the bore member 16. Passing transversely through this extension is a cylindrical aperture 42 whose central axis lies approximately on the axis of curvature of the extension portion. A transverse groove 44 in the wall side of aperture 42 nearest the main body has pockets 44a and 44b offset or jogged from the groove in circumferentially opposite directions. These pockets in turn open endwise from the body 10.

A multicoil helical spring line clamp 40, preferably of stainless spring steel is lodged in aperture 42. It is of diameter slightly smaller than that of the aperture 42 so as to fit readily therein. This line clamp comprises a spring of three to six coils and of a range of contractive force which will firmly pinch a fishing line of the desired size to hold the same firmly against the dislodging force of line tension during fishing, but which will release the line from its clamped position, as shown in FIGURE 7, when it is jerked by a fish striking the line.

The ends 40a and 40b of the spring coil 40 are turned radially outward and lodge in the pockets 44a and 44b with the spring properly fitted into aperture 42. When in unassembled, relaxed condition, before insertion into the aperture, the ends 40a and 40b of the coil occupy positions circumferentially spaced from each other (when viewed longitudinally of the coil) at a distance greater than the circumferential spacing of the cooperating reacting shoulder surfaces of pockets 44a and 44b. Therefore, when inserted in the body aperture, the spring is placed under stress which holds the turned ends thereof within the pockets and the coil firmly against rotation within the aperture. Movement of the coil lengthwise of the aperture is, of course, prevented by ends of the coil bearing against the inner end walls of the pockets 44a and 44b. The clamp is assembled within the body by inserting the same into the transverse aperture 42, allowing the depending end 40b of the spring to enter the transverse groove 44, and twisting the spring against the circumferential recoil force thereof in order to allow the other depending end 40a to engage the pocket 44a as the first end 40b snaps into place in the opposing pocket 44b. This simple arrangement reduces the cost of manufacture, it not being necessary to embed the spring, or any other element for that matter, within the sinker body as it is cast; and it provides removability for replacement, if necessary.

A vertical groove 12a centrally spaced in the forward portion 13 of the body 10 extends longitudinally into the body to intersect the transverse aperture 42, opening into substantially the forward half thereof, the said slot 12a being virtually a forward and downward continuation of the groove 12 in the straight upper edge of the body and corresponding thereto in width. The bottom of the groove 12a thus extends from the forward end of the line-retaining bore member 16 downward, intersecting the top of the transverse aperture 42, and continuing downward from the bottom side of the aperture to open at the bottom of the curved forward portion 13. To secure the sinker at a fixed position on the line by means of the line clamp 40, the line may be moved laterally of itself and into the retaining groove 18 in the bore member 16, the line gripped on opposite ends of the sinker and pulled downward through the vertical groove 12a to wedge it between two coils of the spring clamp 40. The contractive force of the line clamp 40 holds the sinker securely against its own weight and drag force, but due to offsetting of clamp 40 from the normal direction of pull in the line, the line will be held in a deflected condition by the clamp and will free itself to allow the sinker to slide down the line toward the lure in the event a sudden tension is exerted in the line such as occurs with the strike of a heavy fish.

It will be recognized that while certain forms of the invention have been illustrated herein, it is not to be limited to the specific form or arrangement of parts herein described and shown except insofar as such limitations are included in the claims.

I claim as my invention:

1. A fishing slip sinker comprising an elongated body having a longitudinally extending line-receiving groove in one side thereof opening at both ends, a rotatable line retainer positioned in said groove and rotatable about an axis extending lengthwise of said groove, said retainer having a longitudinally extending line-receiving groove in one side thereof open at both ends and having its open side registrable and deregistrable with the body groove by rotation of said retainer between a line-receiving and releasing position and a line-retaining position, respectively, gripping means on said retainer operable to manually revolve the same between such positions comprising a round operating knob having an opening centrally therethrough receiving the retainer therein and having a radial slot extending from its periphery to the central opening thereof, said knob being rigidly joined to said retainer at a position intermediate the ends of the latter with its radial slot in registry with the groove in the retainer, and there being a transverse slot in said body intersecting the line-receiving groove thereof to accommodate said knob, said knob extending outwardly beyond the sides of said body.

2. A slip sinker comprising an elongated body slidably engaged with a fishing line, and releasable line-gripping means comprising a transverse bore through the body adjacent one end thereof, a multicoil helical spring received in said bore and having opposite tips turned at an angle to the circumference of the spring, and there being spring-retaining slot means formed in said body adjacent the ends of the transverse bore engageable by said tips with the spring maintained thereby under stress and against rotation and longitudinal sliding in the bore, and there being a longitudinally extending slot formed in the sinker body which intersects the transverse bore to pass a stretch of fishing line for pinching of the line between spring coils.

3. In a fishing sinker, fishing line retaining means comprising an elongated sinker body, there being a groove extending longitudinally in the top of said body and opening through both ends thereof, the groove having an enlarged base comprising a cylindrical bore extending longitudinally through the body, a revolvable assembly operable to retain a fishing line slidably therewithin, said assembly including a cylindrical revolvable member of non-corrosive material mounted in said bore and itself having a groove extending longitudinally therealong which is registrable with said body groove to receive the fishing line, said groove in the cylindrical member extending radially substantially to the central longitudinal axis of the cylindrical member and opening at both ends thereof, and gripping means on said cylindrical member operable to manually revolve the same from a position of registry of the groove therein with the body groove to a position of de-registry therewith to hold the fishing line slidably within said bore, said gripping means comprising a round operating knob of larger diameter than said cylindrical member and having an opening centrally therethrough receiving the cylindrical member therein and having a radial groove therein extending from its periphery to the central opening thereof, said operating knob being mounted on said cylindrical member for conjoint rotation therewith at a position intermediate the ends of the latter, with the radial groove thereof in registry with the groove in the cylindrical member, there being a transverse slot in said body intersecting the groove in the body to accommodate said knob, and detent means interacting between the body and the revolvable assembly to releasably detain the latter in a rotative position of non-registry of the slot in said cylindrical member with the slot in the body.

4. The fishing line retaining means defined in claim 3 wherein the diameter of said operating knob exceeds the thickness of the body at the top thereof, thereby to extend transversely beyond the sides and top of said body and facilitate manual gripping of said knob and guiding the fishing line into said groove.

5. The fishing sinker defined in claim 4, wherein the detent means comprises a ball element and cooperating resilient member retained in the transverse slot, said resilient member reacting against said ball element to press the latter against the knob, said ball element having a diameter exceeding the groove width in the knob and adapted to enter such groove partially for detent purposes.

6. The fishing sinker defined in claim 5, wherein the knob has a recess therein displaced circumferentially from its groove and engageable by the ball element with the knob groove in registry with the body groove.

7. The fishing line retaining means defined in claim 3 wherein said cylindrical member comprises an elongated member of uniform diameter throughout its length insertable lengthwise into said bore, said member having a recess formed therein at a position intermediate its ends corresponding to the position of the transverse slot in said body, for securing said knob thereto, the central opening of said knob being normally smaller than the diameter of said cylindrical member but the said knob being resiliently expandable to pass slidably over and along the member into contractile locking engagement thereof with the recess.

8. A fishing slip sinker comprising an elongated body having a longitudinally extending line-receiving groove in one side thereof opening at both ends, a rotatable line retainer positioned in said groove and rotatable about an axis extending lengthwise of said groove, said retainer having a longitudinally extending line-receiving groove in one side thereof open at both ends and having its open side registrable and deregistrable with the body groove by rotation of said retainer between a line-receiving and releasing position and a line-retaining position, respectively, means on said retainer to permit gripping the same for rotation between such positions, and releasable line-gripping means comprising a transverse bore through the body adjacent one end thereof, a multicoil helical spring received in said bore and having opposite tips turned at an angle to the circumference of the spring, and spring-retaining slot means formed in said body adjacent the ends of the transverse bore engageable by said tips with the spring maintained thereby under stress and against rotation and longitudinal sliding in the bore, and there being a longitudinally extending slot formed in the sinker body which intersects the transverse bore to pass a stretch of fishing line for pinching of the line between spring coils.

9. The slip sinker defined in claim 8, wherein said slot means comprises a transverse groove opening into said transverse bore and extending the full length thereof, and a pocket formed at each end of said transverse groove and extending in opposite directions therefrom circumferentially of said bore in relative positions to receive said spring tips therein only with the tips relatively rotated through an angle of displacement which compresses the spring, said tips thereupon being retained in said pockets by stress in the spring.

10. The slip sinker defined in claim 2, wherein said slot means comprises a transverse groove opening into said transverse bore and extending the full length thereof, and a pocket formed at each end of said transverse groove and extending in opposite directions therefrom circumferentially of said bore in relative positions to receive said spring tips therein only with the tips relatvely rotated through an angle of displacement which compresses the spring, said tips thereupon being retained in said pockets by stress in the spring.

References Cited in the file of this patent

UNITED STATES PATENTS

| 1,271,297 | Farnham | July 2, 1918 |
| 2,257,415 | Gerdin | Sept. 30, 1941 |
| 2,425,069 | Metzler | Aug. 5, 1947 |
| 2,662,328 | Oyler | Dec. 15, 1953 |
| 2,760,810 | Smith | Aug. 28, 1956 |
| 2,809,460 | Taylor | Oct. 15, 1957 |

FOREIGN PATENTS

| 569,118 | Belgium | July 31, 1958 |